J. H. TOBIN.
AUTOMOBILE BUMPER.
APPLICATION FILED FEB. 1, 1921.

1,376,301. Patented Apr. 26, 1921.

J. H. Tobin, Inventor

By Geo. F. Kimmel, Attorney

UNITED STATES PATENT OFFICE.

JAMES H. TOBIN, OF ERIE, PENNSYLVANIA.

AUTOMOBILE-BUMPER.

1,376,301.  Specification of Letters Patent.  Patented Apr. 26, 1921.

Application filed February 1, 1921. Serial No. 441,622.

*To all whom it may concern:*

Be it known that I, JAMES H. TOBIN, a citizen of the United States, residing at Erie, in the county of Erie and State of Pennsylvania, have invented certain new and useful Improvements in Automobile-Bumpers, of which the following is a specification.

This invention relates to automobile bumpers and more particularly to that type of devices adapted to be mounted on the forward portion of the vehicle frame to prevent damage to the machine upon impact with the bumpers or parts of other machines.

The primary object of the invention is the construction of a novel and improved form of bumper wherein the spring supporting the bumper bar and the mounting thereof is of novel design and construction affording provision for engaging the bumpers of other machines regardless of the height thereof and thus preventing impact of the body of the machine and the subsequent possible damage thereto.

A still further object of the invention resides in the construction of an automobile spring bumper for mounting to the forward frame of a machine so that it may extend at a more or less considerable distance in advance of the front body to prevent damage thereof due to impact or collision with other machines, said mounting being provided with an anti-rattling device which also prevents vibration of the said bumper.

Another and very important object of the invention relates to a spring mounted automobile bumper including a novel and improved clamping device whereby the bumper bar may be easily removed from the springs for repairs or replacement without detaching the springs or removing the same from the body of the machine.

A continued object of the invention will be found to reside in a spring bumper consisting of comparatively few but simple parts, capable of being easily assembled and manufactured at an extremely low cost, highly efficient, durable and rigid in construction, of universal application and particularly designed and adapted to be attached to various types of machines and otherwise meeting the rigid requirements and withstanding the tests of rough use to which devices of this character are designed to overcome.

With these objects in view and others which will be suggested and manifest as the description proceeds, I have shown my invention in one form by way of example wherein, Figure 1 is a plan view showing the bumper attached to the forward part of a machine, Fig. 2 is a front view of the bumper.

Figure 1:
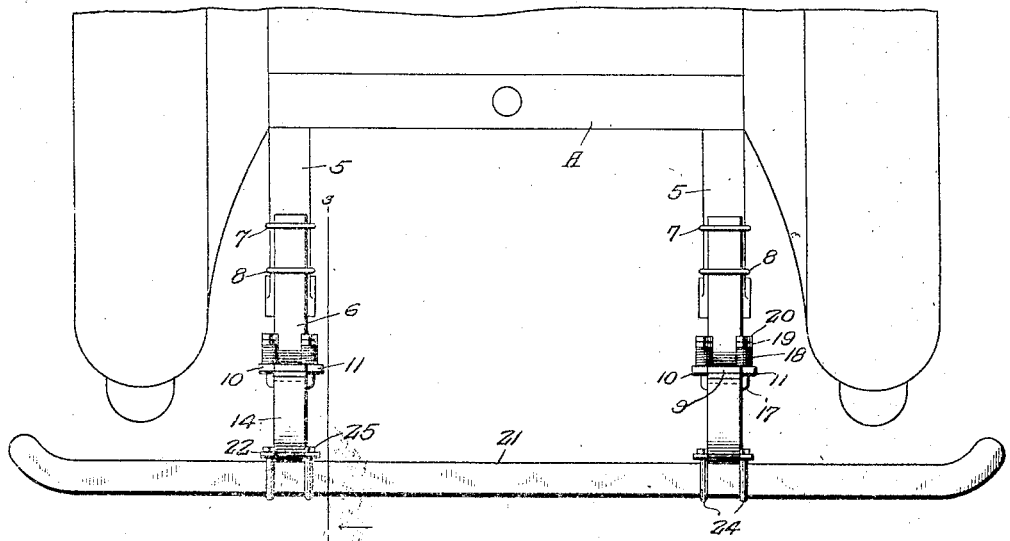
Figure 2:
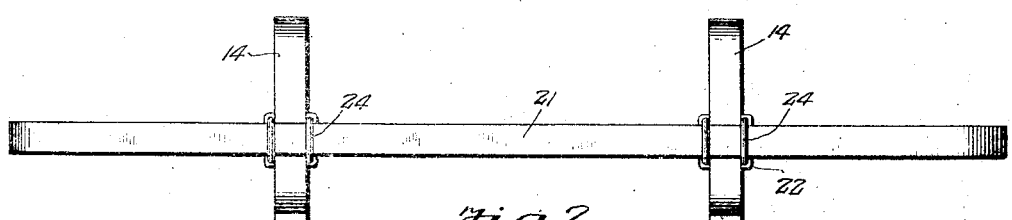
Figure 4:
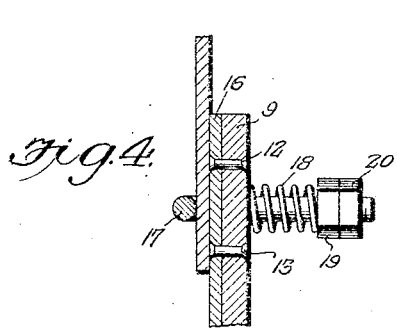
Fig. 4 is a sectional view through the anti-rattling device.
Figure 3:
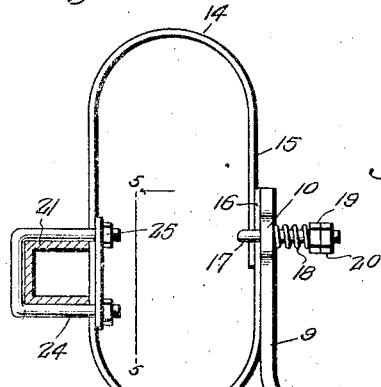
Fig. 3 is a view taken on the line 3—3 of Fig. 1.
Figure 5:
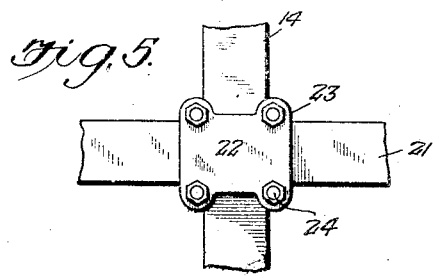
Fig. 5 is a view taken on the line 5—5 of Fig. 3.

Referring now to the drawing wherein like parts designate similar and corresponding parts in the specification, A designates a front portion of an automobile having the usual front ends 5, of the side bars of the frame of the machine to which the bumper now to be described is mounted.

The bumper proper is adapted to be mounted or rigidly secured in any well known manner to the front portion of the side bars 5 and for this purpose I have shown a pair of substantially V-shaped hangers 6 preferably constructed of wide, flat metal so as to lie flush with the head side bars and be secured thereto by a pair of U-shaped fastening elements 7, 8 as clearly shown and indicated in Fig. 1 of the drawing. The vertical leg portion 9 of the said V-shaped hangers are each provided with a pair of oppositely positioned apertured ears 10, 11, and are preferably riveted at 12, 13 above and below said ears to an elliptical spring designated in its entirety by 14. The loose or free end 15 of said spring normally overlies the opposite end 16, which as above described is riveted to the V-shaped hanger, and in order to secure the free end 15 to the said hanger, I have provided a U-shaped clevis member 17 which passes through the apertures in the respective ears 10, 11, each leg portion of said clevis being provided with a resilient spring 18 which bears against a threaded nut 19 and is prevented from being removed from said clevis by locking nuts 20 on the end thereof.

From this construction, it will be readily seen that the clevis not only forms a ready attaching device for securing the end of the frame to the hanger, but also affords means for positioning the resilient springs 18 thereon to prevent rattling and vibration of the said spring and bumper bar when carried by the vehicle. It will of course be readily understood that various types of flat metal springs may be secured to and held by the clevis and hanger and while I have shown the spring as riveted to the said hanger, it will be of course readily understood that the same may be provided with other suitable attaching means whereby the spring may be removed as an entirety with the bumper bar now to be described.

Secured to the front portion of the spring 14, I have shown a bumper bar 21 of channel iron, it being readily apparent that either resilient or rigid bumper bars are equally adapted to be secured to the spring construction above described. For the purposes of securing the bumper bar to the spring, I have shown a substantially square attaching plate 22 with apertured ears 23 at its respective corners whereby U-shaped bolts 24 may embrace the bumper bar and be secured to the attaching plate 22 by threaded elements 24. By this construction the device lends itself to the easy and ready removal of the bumper bar whenever desired to repair or replace the same without in any way rearranging or removing either the spring or the hanger from the machine. Since the hangers 6 are rigidly mounted it will be furthermore seen that the impact to the bumper bar 21 will at all times be taken up by the spring 14. Of course the attaching plate 22 permits the same and the bumper bar to be raised or lowered with respect to the said spring 14 to meet the desired needs, it being readily understood that the frames of some automobiles are higher or lower than others and the arrangement is in practice such as to afford the greatest amount of protection where the bumper is desired to be used.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention what I now claim as new and desire to secure by Letters Patent of the U. S. is:—

1. In an automobile bumper construction comprising substantially V-shaped hangers for mounting on the frame of an automobile, vertically arranged, elliptical springs supported by said hangers, and a transversely extending bumper bar detachably and adjustably supported by said springs.

2. In an automobile bumper construction comprising substantially V-shaped hangers, for mounting to the frame of an automobile, vertically arranged, elongated elliptical springs rigidly supported by the free ends of said hangers, a transverse bumper bar carried by said springs, attaching plates and removable bolts embracing the bumper bar for detachably and adjustably securing said bumper bar to various positions with respect to the springs and the hangers.

3. In an automobile bumper construction comprising substantially V-shaped hangers for mounting to the frame of an automobile, vertically arranged, elongated elliptical springs rigidly supported by said hangers, apertured ears formed in the free ends of said hangers, clevis members passing through said ears for securing the free ends of said springs to the hangers, anti-rattling means carried by said clevises, and a transverse bumper bar detachably secured and vertically adjustable with respect to said springs and hangers.

4. In an automobile bumper construction comprising substantially V-shaped hangers for mounting to the frame of an automobile, vertically arranged, elongated elliptical springs rigidly supported by said hangers, apertured ears formed in the free ends of said hangers and near the extremities thereof, clevis members passing through said ears for securing the free end of said springs to said hangers, anti-rattling means carried by said clevises to prevent vibration of said springs, a transverse bumper bar carried by the forward portion of said springs, attaching plates normally lying flush with the interior of said springs, removable, U-shaped bolts embracing the said bumper bar and secured to the attaching plates whereby the said bar may be raised or lowered with respect to the springs or entirely removed from the springs.

In testimony whereof, I affix my signature hereto.

JAMES H. TOLAN.